(12) United States Patent
Kallage et al.

(10) Patent No.: US 12,330,235 B2
(45) Date of Patent: Jun. 17, 2025

(54) LASER WELDING OF METAL PIN PAIRS WITH TIME-DEPENDENT SCAN PATTERN AND ENERGY INPUT

(71) Applicant: Corelase Oy, Tampere (FI)

(72) Inventors: Peter Kallage, Hamburg (DE); Oliver Forster, Güster (DE); Oliver Kraus, Jork (DE); Falk Nagel, Bad Oldesloe (DE); Stefan Schulz, Güster (DE)

(73) Assignee: Corelase Oy, Tampere (FI)

( * ) Notice: Subject to any disclaimer, the term of this patent is extended or adjusted under 35 U.S.C. 154(b) by 768 days.

(21) Appl. No.: 16/994,439

(22) Filed: Aug. 14, 2020

(65) Prior Publication Data

US 2022/0048137 A1  Feb. 17, 2022

(51) Int. Cl.
*B23K 26/28* (2014.01)
*B23K 26/082* (2014.01)
(Continued)

(52) U.S. Cl.
CPC ............ *B23K 26/28* (2013.01); *B23K 26/082* (2015.10); *B23K 2101/36* (2018.08); *B23K 2103/12* (2018.08)

(58) Field of Classification Search
CPC .. B23K 26/28; B23K 26/082; B23K 2101/36; B23K 2101/38; B23K 2103/12; B23K 2103/10; B23K 2103/00; B23K 2103/02; B23K 2103/04; B23K 26/0626; B23K 26/02; B23K 26/0853; B23K 26/0861; B23K 26/0869; B23K 26/0876; B23K 26/0884; B23K 26/206; B23K 26/20; B23K 26/26; B23K 26/244; B23K 26/32;
(Continued)

(56) References Cited

U.S. PATENT DOCUMENTS

| 10,195,689 B2* | 2/2019 | Yang ................... B23K 26/244 |
| 10,239,154 B2 | 2/2019 | Yang et al. |

(Continued)

FOREIGN PATENT DOCUMENTS

| DE | 102019103668 A1 | 8/2020 |
| IT | 201700023491 | * 9/2018 |

(Continued)

OTHER PUBLICATIONS

English translation to IT 201700023491 (Year: 2018).*
(Continued)

*Primary Examiner* — Sang Y Paik
*Assistant Examiner* — Bonita Khlok
(74) *Attorney, Agent, or Firm* — Morrison & Foerster LLP

(57) ABSTRACT

A method for laser welding a pair of metal pins delivers a laser beam to a work-side of the pair of metal pins where a respective pair of surfaces of the metal pins are adjacent to each other and face in the same direction. The laser beam first traces a first path on the work-side to form a melt pool by keyhole welding. The first path crosses an interface between the metal pins. After tracing the first path, the laser beam is switched to trace a second path on the work-side with the laser beam at a delivered rate of energy per unit path length that is less than the one used for the first path. The second path crosses the interface and is within the first path. The method is well-suited for welding of hairpin and I-pin stators.

21 Claims, 7 Drawing Sheets

(51) Int. Cl.
*B23K 101/36* (2006.01)
*B23K 103/12* (2006.01)

(58) Field of Classification Search
CPC ...... B23K 26/22; B23K 26/24; B23K 26/062; H02K 15/02
USPC .............. 219/121.64, 121.63, 121.14, 121.6, 219/121.61, 121.78–121.79, 121.82; 403/270; 174/84 R
See application file for complete search history.

(56) References Cited

U.S. PATENT DOCUMENTS

| | | | | |
|---|---|---|---|---|
| 2006/0011592 | A1* | 1/2006 | Wang | B23K 26/034 219/121.64 |
| 2016/0303686 | A1* | 10/2016 | Ciampolini | H02K 15/0081 |
| 2016/0308413 | A1* | 10/2016 | Ciampolini | H02K 15/0081 |
| 2017/0274473 | A1* | 9/2017 | Naito | B23K 26/035 |
| 2018/0304405 | A1* | 10/2018 | Yang | B23K 26/32 |
| 2018/0361506 | A1* | 12/2018 | Tateyama | B23K 26/704 |
| 2020/0083787 | A1* | 3/2020 | Fujiyoshi | B23K 26/0626 |
| 2020/0114469 | A1* | 4/2020 | Tao | B23K 26/244 |
| 2021/0379698 | A1 | 12/2021 | Sakai et al. | |

FOREIGN PATENT DOCUMENTS

| | | |
|---|---|---|
| IT | 201700023491 A1 | 9/2018 |
| JP | 6674588 B1 | 4/2020 |
| WO | WO-2019159737 A1 | 8/2019 |
| WO | 2019/197119 A1 | 10/2019 |

OTHER PUBLICATIONS

Zhang et al., "Spatter Reduction by using Keyhole Stir Laser Welding Process", International Congress on Applications of Lasers & Electro-Optics, Paper 902, 2016, 6 pages.

International Search Report and Written Opinion received for International Patent Application No. PCT/EP2021/072180 mailed on Feb. 10, 2022, 12 pages.

* cited by examiner

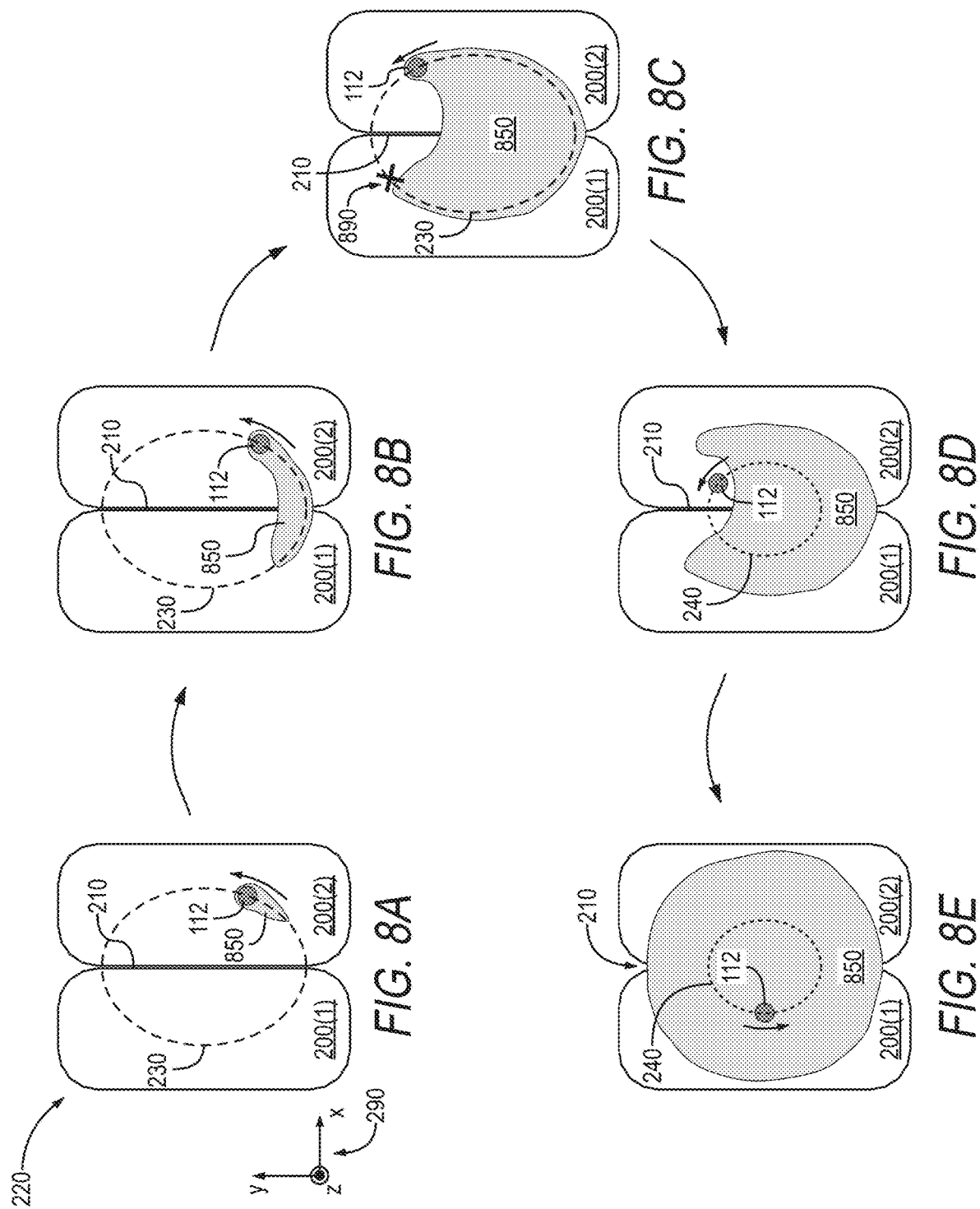

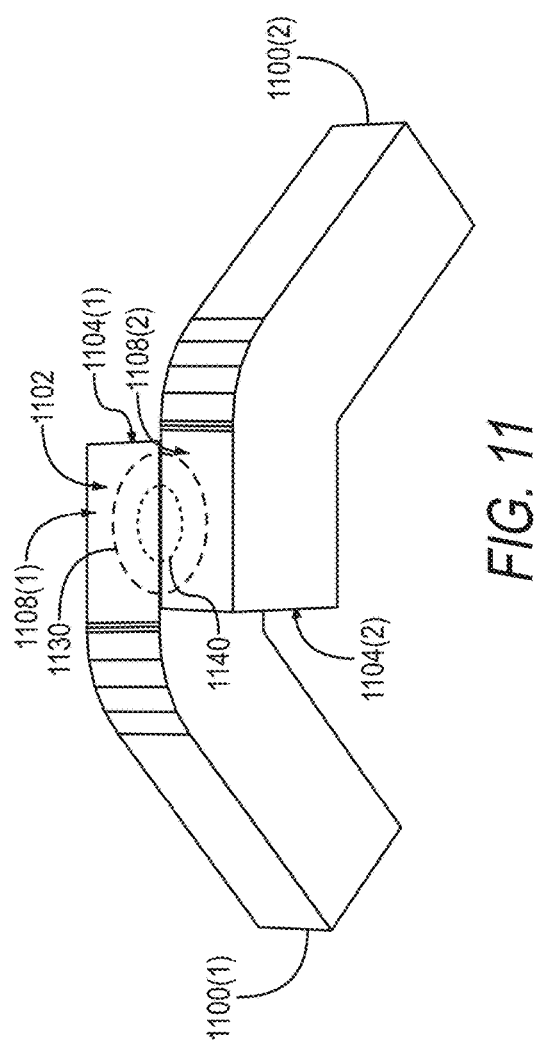
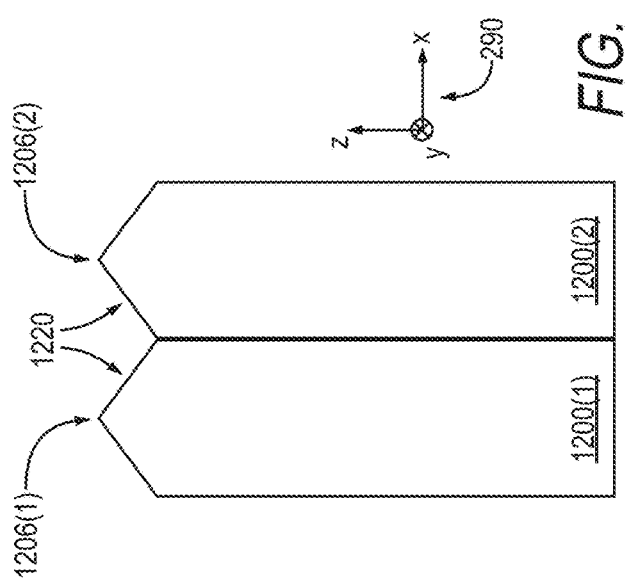

LASER WELDING OF METAL PIN PAIRS WITH TIME-DEPENDENT SCAN PATTERN AND ENERGY INPUT

TECHNICAL FIELD OF THE INVENTION

The present invention relates in general to laser welding of metal pin pairs, in particular hairpins and I-pins of rectangular-wire stators.

DISCUSSION OF BACKGROUND ART

Laser welding uses a continuous or pulsed laser beam as a concentrated heat source to locally melt and join two parts, typically made of metal. The laser beam may be focused to a relatively small spot, resulting in a high power density and small heat-affected zone. Laser welding is therefore an attractive technique when accuracy and a high degree of control is required. Furthermore, laser welding lends itself well to automation.

In laser welding, a focused laser beam locates each weld spot or line precisely, while minimizing collateral heating. It is useful to distinguish two main laser welding regimes. Conduction welding occurs at lower laser powers and lower laser power densities. Absorbed laser power heats the irradiated material, thereby melting material in each part to be joined, which flows, mixes, and then solidifies. Keyhole welding occurs at higher laser powers and higher laser power densities that are sufficient to vaporize some of the irradiated material. Pressure of the vaporized material on surrounding melted material opens a channel through the melted material. This channel, known in the art as a keyhole, has a characteristic narrow and deep profile, which allows deep penetration of the laser beam. Finished keyhole welds are generally narrower, deeper, and stronger than conduction welds.

Laser beam welding has been used to weld hairpin stators. Generally, a "stator" has a set of electric windings that exchange energy with a magnetic rotor. Together, the stator and the rotor form the basis of electric motors and generators. In an electric motor, current is passed through the windings of the stator to generate a rotating magnetic field that drives a magnetic rotor. In an electric generator, the stator converts the rotating magnetic field of the magnetic rotor into electric current. A hairpin stator uses thick rectangular bar wire for its windings. Rectangular bar wire can be packed in the stator with a higher fill factor than conventionally wound round wire. Stators with rectangular bar wire are therefore a preferred solution for motors that require a high torque and power density in a relatively compact package. Additionally, the rectangular bar wire is well-suited for liquid cooling. However, the thick rectangular bar wire cannot be wound continuously as conventional round wire. Instead, many hairpin-shaped segments of rectangular bar wire are inserted into slots of a stator ring from one side, with ends of the hairpins extending out of the stator ring on the other side. Adjacent ends are then welded together to form a continuous winding from the individual segments. In some instances, so-called I-pins are used instead of hairpins. Essentially, each hairpin is replaced by two I-pins, and welding of exposed ends is necessary on both sides of the stator ring.

SUMMARY OF THE INVENTION

Disclosed herein is a method for laser welding of metal pin pairs. The method is particularly well-suited for welding of hairpins or I-pins of stators, since the method (a) minimizes or even eliminates spatter during the welding process, (b) prevents or reduces formation of voids in the weld nugget, and (c) maximizes the depth and area of the weld nugget along the interface between the two metal pins. Spatter is an undesirable effect in keyhole welding where the metal evaporation is sufficiently violent that metal droplets are ejected during the welding process. This ejection of droplets reduces the volume of the weld nugget in an irregular and poorly controlled fashion. Spatter therefore adversely impacts electrical conductivity through the weld, thus at least partly undermining the benefits of using rectangular bar wires in stators. The formation of voids is another undesirable effect in keyhole welding where bubbles of metal gas fail to escape to the surface before the melted metal solidifies. Voids impede electrical conduction of the weld nugget. The ability to pass electrical current from one of the metal pins to the other is also affected by geometrical aspects of the weld nugget. For example, a larger cross-sectional area of the weld nugget at the interface between the two metal pins corresponds to better overall electrical conduction between the two metal pins. The present method applies a time-dependent laser scan pattern and energy input to resolve these issues.

In one aspect, a method for laser welding a pair of metal pins includes the steps of (a) delivering a laser beam to a work-side of the pair of metal pins where a respective pair of surfaces of the metal pins are adjacent to each other and face in the same direction, (b) tracing a first path on the work-side with the laser beam at a first delivered rate of energy per unit path length to form a melt pool by keyhole welding, wherein the first path crosses an interface between the metal pins, and (c) after the tracing a first path step, tracing a second path on the work-side with the laser beam at a second delivered rate of energy per unit path length that is at most ⅔ of the first delivered rate of energy per unit path length, wherein the second path crosses the interface and is within the first path.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

FIGS. 8A-E is a series of diagrams illustrating one example of laser welding of a metal pin pair according to the method of FIG. 3.

FIG. 11 illustrates pair of metal pins that are joined such that their respective end surfaces face in opposite directions, according to an embodiment.

FIG. 12 illustrates one example of a metal pin pair joined with a non-planar work-side for laser welding according to the method of FIG. 3.

DETAILED DESCRIPTION OF THE INVENTION

Figure 1:
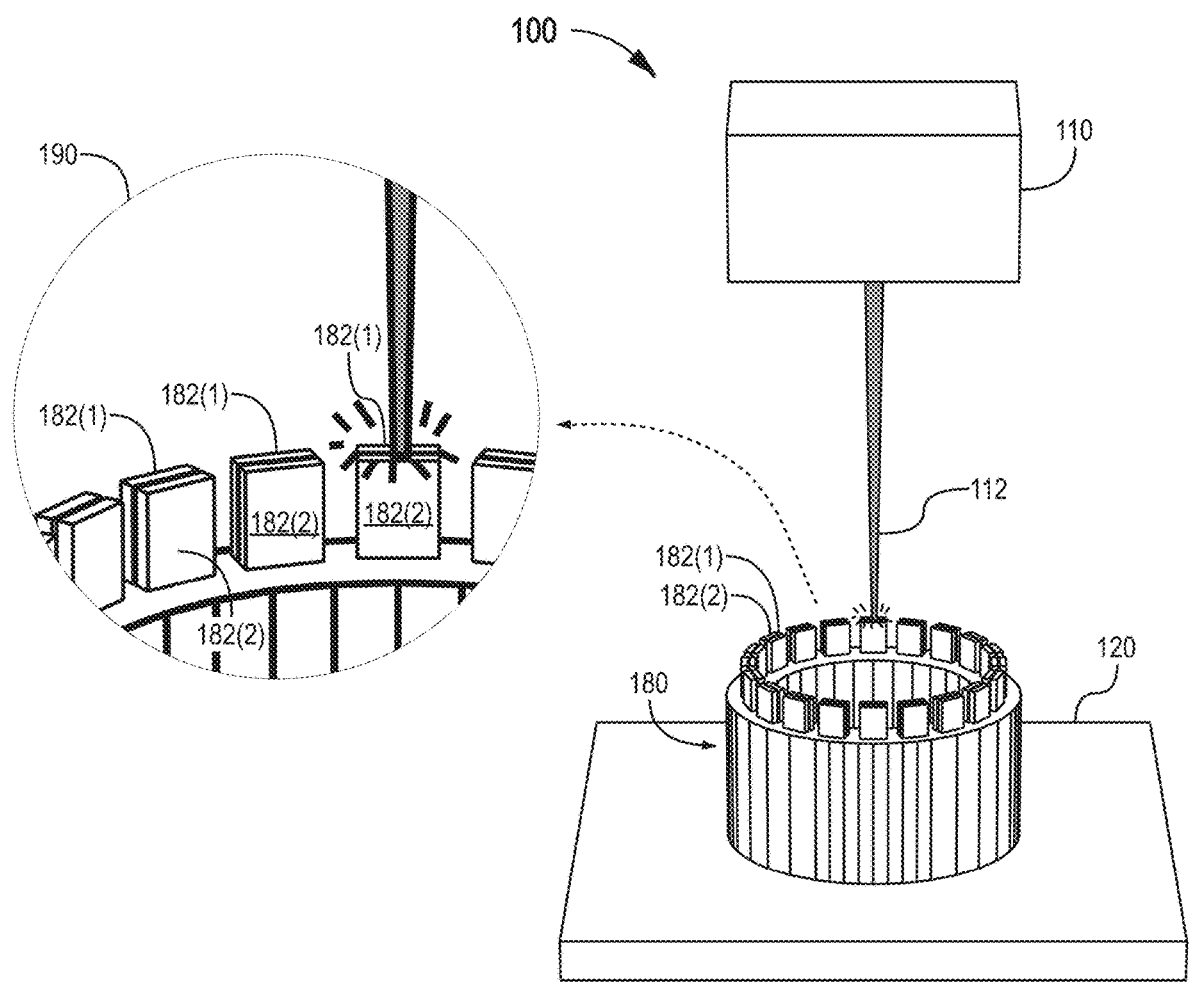
FIG. 1 illustrates one laser welding apparatus for welding metal pin pairs, according to an embodiment.

Referring now to the drawings, wherein like components are designated by like numerals, FIG. 1 illustrates one laser welding apparatus 100 for welding metal pin pairs. In the example use scenario depicted in FIG. 1, laser welding apparatus 100 is welding pairs of metal pins 182(1) and 182(2) of a stator 180. Each metal pin 182 may be a hairpin or an I-pin. A more detailed view of some of hairpin pairs 182(1,2) is provided in a closeup 190 of a portion of stator 180. Laser welding apparatus 100 includes a laser source 110 and a fixture 120. Laser source 110 generates a laser beam 112. In one embodiment, laser beam 112 is either pulsed or continuous-wave, and laser source 110 is capable of delivering an average power of at least 1 kilowatt. Laser beam 112 may be near-infrared or visible (e.g., green). Laser welding apparatus 100 is configured to move laser beam 112 relative to stator 180 to sequentially weld each pair of metal pins 182(1,2), with laser beam 112 tracing a time-dependent scan pattern on a work-side of each pair of metal pins 182(1,2). In one implementation fixture 120 rotates stator 180 in steps to, one by one, position metal pin pairs 182(1,2) at a focus of laser beam 120, and laser source 110 uses a beam scanner to trace the time-dependent scan pattern on the work-side of each metal pin pair 182(1,2). In another implementation, all movement is done by laser source 110. For example, the location of a beam scanner of laser source 110 may be shifted to sequentially address each metal pin pair 182(1,2), where the beam scanner is then operated to trace the time-dependent scan pattern on the work-side of each metal pin pair 182(1,2).

Figure 2:
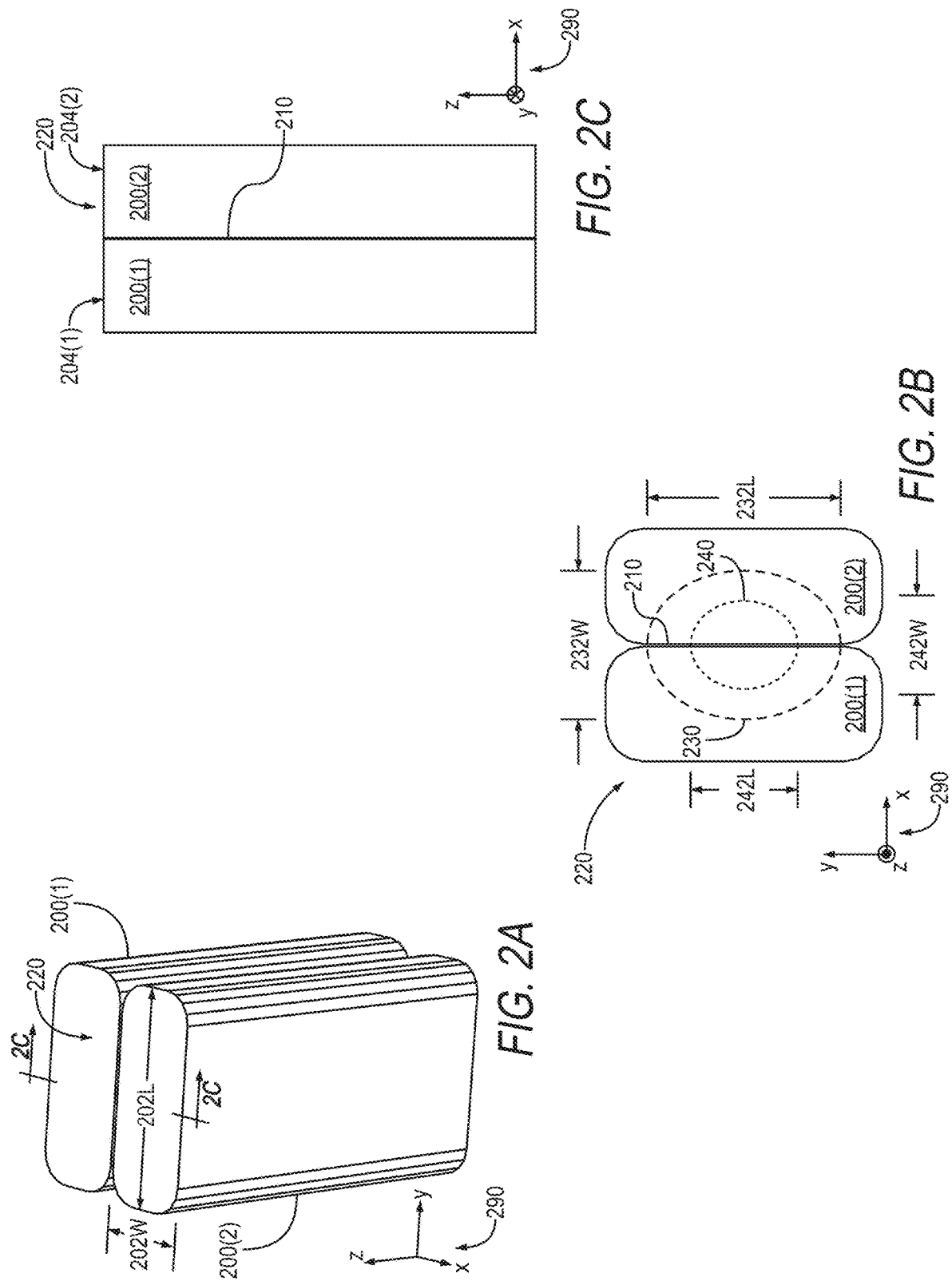
FIGS. 2A-C illustrate a pair of metal pins and elliptical paths traced by a laser beam during laser welding of the pair of metal pins, according to an embodiment.

FIGS. 2A-C illustrate a pair of metal pins 200(1) and 200(2). Metal pin pair 200(1,2) is, for example, hairpins or I-pins of a stator, such as metal pin pair 182(1,2) of stator 180. Most commonly, stators use copper pins. Thus, metal pins 200(1) and 200(2) may be made of copper. Alternatively, metal pins 200(1) and 200(2) may be made of aluminum or another metal. FIG. 2A shows metal pin pair 200(1,2) in perspective view. FIG. 2B is a top plan view of a work-side 220 formed by end surfaces of metal pins 200(1) and 200(2). FIG. 2C is a cross-sectional side view of metal pin pair 200(1,2) taken as indicated by line 2C-2C in FIG. 2A. A cartesian coordinate system 290 indicates the orientation of metal pin pair 182(1,2) in each of FIGS. 2A-2C. Work-side 220 faces in the positive z-axis direction. Each metal pin 200 may extend in the negative z-axis direction beyond what is depicted in FIGS. 2A and 2C, such that FIGS. 2A and 2C only show an end-portion of each metal pin 200. In addition, outside the views of FIGS. 2A-C, a non-end-portion of each metal pin 200 may be bent, for example as is customary for hairpins and I-pins.

Metal pins 200(1) and 200(2) are positioned next to each other, forming an interface 210 therebetween. Interface 210 is parallel to the yz-plane. Metal pins 200(1) and 200(2) may be in direct contact with each other at interface 210. Without departing from the scope hereof, a gap between metal pins 200(1) and 200(2) may exist at all or parts of interface 210.

As shown in FIG. 2B, work-side 220 is formed by end surfaces 204(1) and 204(2) of metal pins 200(1) and 200(2), respectively. FIGS. 2A-C show each end surface 204 as being planar, and end surfaces 204(1) and 204(2) as being coplanar with each other. For example, hairpins and I-pins are typically cut from long rods of rectangular bar wire, and the cutting process may leave a ridge on the end of each pin as well as produce other non-planarity. Additionally, positioning of hairpins and I-pins may be subject to manufacturing tolerances.

Each metal pin 200 has width 202W along the x-axis and length 202L along the y-axis. In one example, width 202W is in the range between 1 and 3 millimeters (mm), and length 202L is in the range between 3 and 10 mm. Each end surface 204 may have a rounded rectangular shape, as shown in FIGS. 2A-C, a true rectangular shape, or even a non-rectangular trapezoidal shape.

Figure 3:
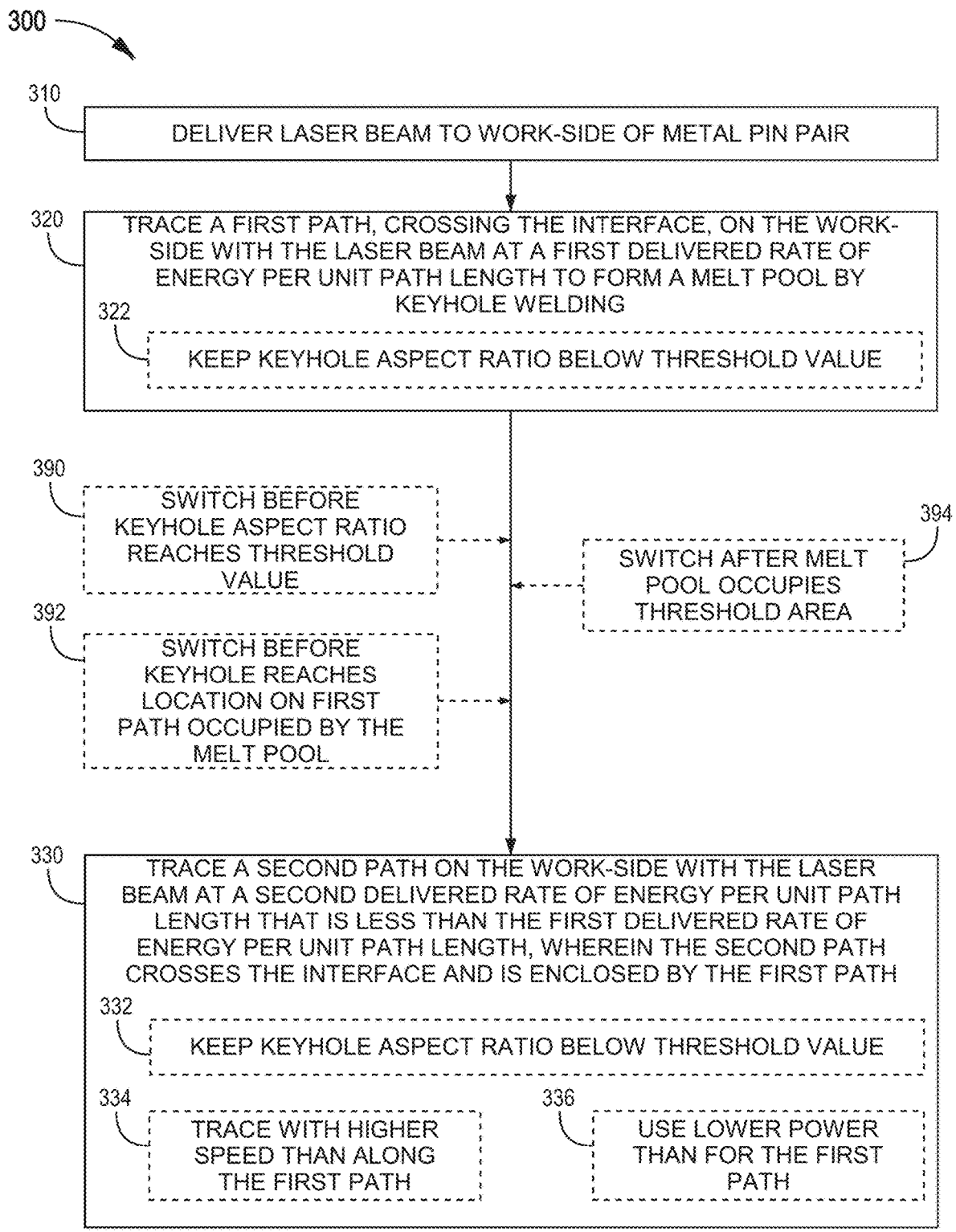
FIG. 3 is a flowchart for a method for welding a pair of metal pins, according to an embodiment.

FIG. 3 is a flowchart for one method 300 for welding a pair of metal pins. Method 300 may be used to weld metal pin pair 200(1,2), and may be performed by laser welding apparatus 100. Method 300 moves a laser beam on a work-side of the metal pin pair in a time-dependent scan pattern and with a time-dependent energy delivery rate. The time-dependent scan pattern and energy delivery rate serve to minimize, or eliminate, spatter and maximize the area of the welded interface.

Figure 5:
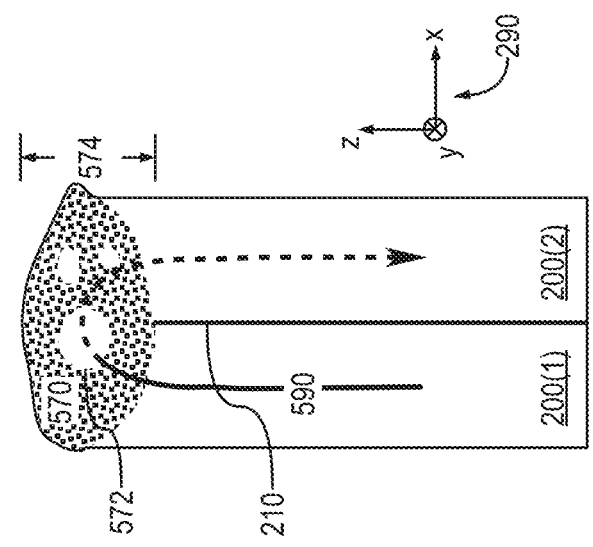
FIG. 5 shows an example of a metal pin pair as laser welded according to a conventional laser welding process.
Figure 4:
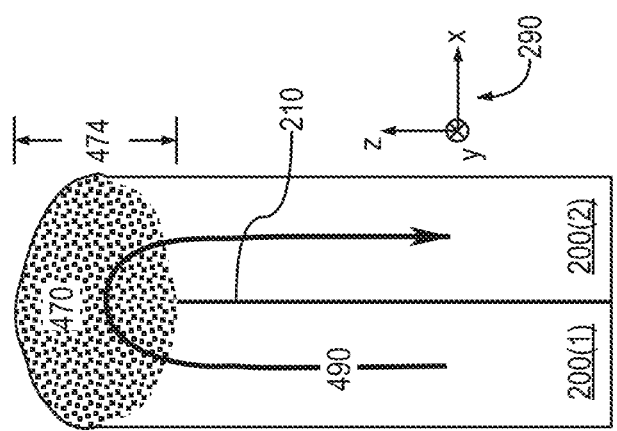
FIG. 4 shows an example of a metal pin pair as laser welded according to the method of FIG. 3.

FIGS. 4 and 5 illustrate metal pin pair 200(1,2) as welded according to method 300 and a conventional laser welding method, respectively. FIG. 4 shows, in the same cross-sectional view as used in FIG. 2C, metal pin pair 200(1,2) as laser welded according to method 300. Method 300 forms a weld nugget 470 crossing over interface 210 and having a depth 474 along interface 210 (along the z-axis). FIG. 5 shows, in the same cross-sectional view as used in FIG. 2C, metal pin pair 200(1,2) as laser welded according to a conventional laser welding process. The conventional laser welding process forms a weld nugget 570 crossing over interface 210 and having a depth 574 along interface 210.

Weld nugget 570 has several voids 572, caused by metal gas bubbles being entrapped in the melted metal during the conventional laser welding process. In the case of weld nugget 470, method 300 eliminates or at least minimizes the presence of voids. By optimizing melting at interface 210 and reducing or eliminating loss of weld nugget material due to spatter, method 300 further maximizes depth 474 of weld nugget 470 such that depth 474 of weld nugget 470 exceeds depth 574 of weld nugget 570. Voids 572 of weld nugget 570 have no electrical conductivity and therefore impede flow of current 590 between conventionally welded metal pins 200(1) and 200(2). The shallower depth 574 of weld nugget 570 may further impede flow of current 590. In contrast, current 490 through weld nugget 470 is not impeded by voids (or at least only minimally so), and depth 474 may be sufficient to not impede current 490 beyond the impedance associated with the cross-sectional area of each metal pin 200 perpendicular to the flow of current 490.

Referring again to FIG. 3, method 300 includes steps 310, 320, and 330. Step 310 delivers a laser beam to a work-side of a metal pin pair where a respective pair of surfaces of the metal pins are adjacent to each other and face in the same direction. In one example of step 310, laser source 110 delivers laser beam 112 to work-side 220 of metal pin pair 200(1,2).

Step 320 traces a first path on the work-side to form a melt pool by keyhole welding. The first path crosses the interface between the metal pins. In step 320, the laser beam power and the speed with which the laser beam travels along the first path correspond to a first delivered rate of energy per unit length of the first path. Herein, a delivered rate of energy refers to the energy of laser radiation incident on the metal part, regardless of whether the laser radiation is absorbed or reflected. In one example of step 320, laser beam 112 traces path 230 (indicated in FIG. 2B) on work-side 220 of metal pin pair 200(1,2). Laser beam 112 may make one circuit, several circuits, or a partial circuit on work-side 220 along path 230. After performing step 320 for a certain duration, method 300 switches to step 330.

Step 330 traces a second path on the work-side. The second path crosses the interface between the metal pins and is within the first path. Herein, the term within the first path encompasses scenarios where the first path does not complete a full 360-degree circuit on work-side 220. In such scenarios, the second path is within the extrapolation of the first path to a full 360-degree circuit. In step 330, the laser beam power and the speed with which the laser beam travels along the second path correspond to a second delivered rate of energy per unit length of the second path. The second delivered rate of energy is lower than the first delivered rate of energy of step 320. In one example of step 330, laser source 110 traces path 240 (indicated in FIG. 2B) on work-side 220 of metal pin pair 200(1,2). Laser beam 112 typically makes several circuits on work-side 220 along path 240. Path 230 is more peripheral than path 240, and path 240 is within path 230. The shape of paths 230 and 240 may be different from the ellipses shown in FIG. 2B. Each of paths 230 and 240 may be a closed path (e.g., an ellipse, circle, or rectangle) or an open path (e.g., a spiral). When the paths are elliptical, the major axis of the elliptical paths may be aligned with the interface between the metal pins, or aligned with a longer dimension of the work-side.

Figure 6:
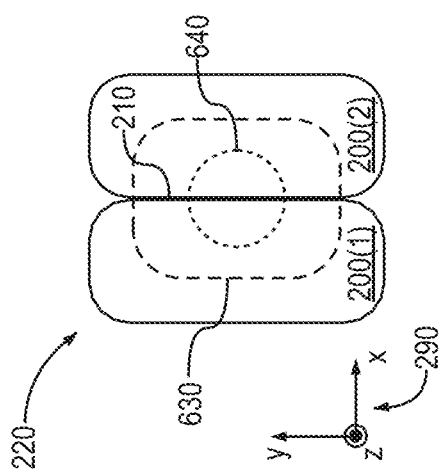
FIG. 6 shows an example of a closed-path alternative to the elliptical paths of FIG. 2B.

FIG. 6 shows one closed-path alternative to the elliptical paths of FIG. 2B. Here, a first path 630 is a rounded rectangle with its long axis aligned along interface 210, and a second path 640 is a circle centered on interface 210.

Figure 7:
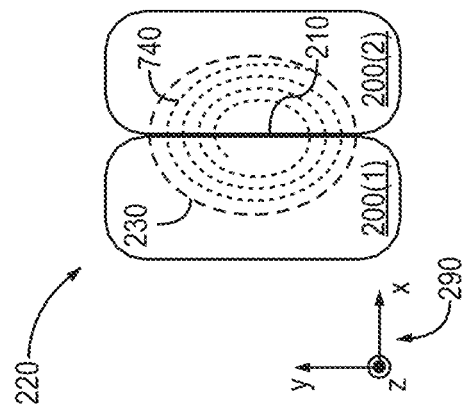
FIG. 7 shows an example of a hybrid closed-open-path alternative to the elliptical paths of FIG. 2B.

FIG. 7 shows one hybrid closed-open-path alternative to the elliptical paths of FIG. 2B. Here, the elliptical second path 240 is replaced by a spiral-shaped second path 740 that spirals inwards from first path 230.

Many other scan patterns are possible. For example, the first and second paths may be (a) consecutive parts of the same inward spiral, (b) concentric circles, or (c) concentric rectangles or rounded rectangles.

FIGS. 8A-E is a series of diagrams illustrating one example of laser welding of metal pin pair 200(1,2) according to method 300. This example uses elliptical paths 230 and 240, but is applicable to other shapes of the first and second paths, such as those discussed above in reference to FIGS. 6 and 7. Each of FIGS. 8A-E is a top plan view of work-side 220 of metal pin pair 200(1,2) at a respective stage of method 300. In step 320, laser beam 112 traces path 230 (see FIG. 8A). Keyhole welding by laser beam 112 along path 230 results in formation of a melt pool 850 that, initially, trails laser beam 112 as it travels along path 230. During step 320, melt pool 850 grows (see FIG. 8B) and, after some time, no longer resembles a local tail trailing laser beam 112 but rather forms a common melt pool that covers a substantial portion of the area within and defined by path 230 (see FIG. 8C). Method 300 then switches to step 330.

The switch from step 320 to step 330 entails two changes, namely (a) reducing the delivered rate of energy per unit path length and (b) moving the energy delivery by laser beam 112 to a more central area on work-side 220 (see FIG. 8D). The reduction in the delivered rate of energy per unit path length serves, at least in part, to avoid or reduce spatter, so as to prevent or minimize loss of material from metal pin pair 200(1,2). During step 330, laser beam 112 continues to melt metal pin pair 200(1,2) to grow melt pool 850 (see FIG. 8E). The delivered rate of energy per unit path length in step 330 is sufficient for keyhole welding, however at a level that avoids or minimizes spatter. The reduction of the delivered rate of energy per unit path length, when switching from step 320 to step 330, may be achieved by increasing the speed with which the laser beam travels across the work-side and/or reducing the power of the laser beam. Accordingly, step 330 may include one or both of (i) a step 334 of tracing the second path with a higher speed than used for the first path in step 320, and (ii) a step 336 of using a lower laser beam power than in step 320. For practical simplicity and a more easily controlled process, an increase in speed may be preferable over a reduction of the laser beam power. Thus, in one embodiment, method 330 includes step 334 and omits step 336 such that the laser beam power is the same in steps 320 and 330.

The move of laser beam 112 to the more central area serves to preferentially grow the cross-sectional area of melt pool 850 at interface 210, while at least for some time benefitting from confinement of melt pool 850 by more un-melted peripheral portions of metal pin pair 200(1,2).

Figure 9A:
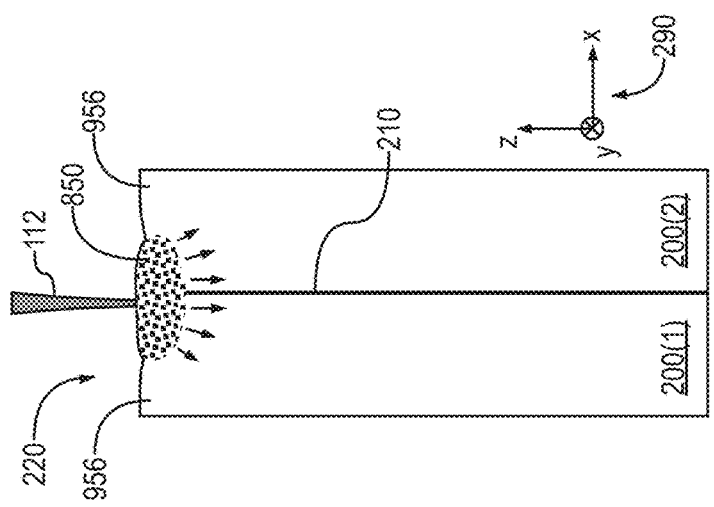
FIGS. 9A and 9B illustrate growth of a melt pool during one step of the method of FIG. 3.
Figure 9B:
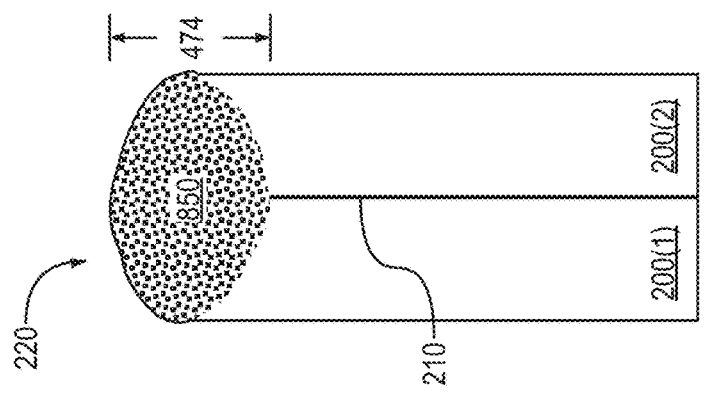

FIGS. 9A and 9B illustrate growth of melt pool 850 during step 330. Each of FIGS. 9A and 9B is a cross-sectional view of metal pin pair 200(1,2) similar to that used in FIG. 2C. As shown in FIG. 9A, while laser beam 112 travels along path 240 and thus heats melt pool 850 from a relatively centered location, un-melted peripheral portions 956 of metal pins 200(1) and 200(2) at least for some time form a barrier that helps prevent melt pool 850 from spilling over the edges of work-side 220. Ultimately, growth of melt pool 850 may include peripheral portions 956 and melt pool may grow to a final size that covers all of work-side 220, as shown in FIG. 9B. The relatively central location of laser beam 112 in step 330 maximizes depth 374 of the final melt pool 850 and thus weld nugget 470 (and maximizes the general cross-sectional area of weld nugget 470 along interface 210). If, instead, laser beam 112 continued along path 230 with a reduced delivered rate of energy per unit path length, the melted material near the periphery of work-side 220 might be lost to spatter or spill over the periphery, such that melt pool 850 does not gain the same final depth 474 along interface 210.

In applications of method 300 applied to sample pairs of metal pins made of copper, we have found that best results are achieved when the transverse dimensions of the second path, along the work-side, are between 20% and 80% of the corresponding transverse dimensions of the first path along the work-side. With reference to FIG. 2B, in one example of method 300, path 230 has a width 232W in the x-dimension and a length 232L in the y-dimension, and path 240 has corresponding width 242W and length 242L, wherein (a) length 232L is between 60% and 90% of length 202L of each metal pin 200, and width 232W is between 50% and 90% of twice the value of width 202W of each metal pin 200, and (b) each of length 242L and width 242W is between 20% and 80% of length 232L and width 232W, respectively.

Referring again to FIG. 3, the reduction in the delivered rate of energy per unit path length between steps 320 and 330 may further serve to reduce or eliminate void formation by limiting the keyhole depth. Metal gas bubbles are more likely to get entrapped when formed far from the surface. Therefore, a shallower keyhole reduces the risk of void formation. The shallower keyhole also reduces the risk of spatter. Therefore, steps 320 and 330 may include steps 322 and 332, respectively, of keeping the depth-to-width keyhole aspect ratio below the threshold value.

Figure 10:
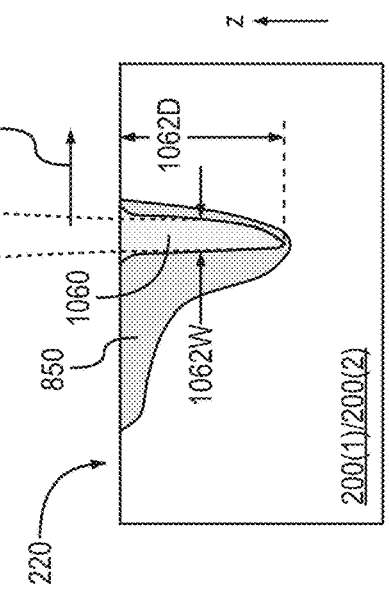
FIG. 10 is a diagram of a depth-to-width keyhole aspect ratio.

FIG. 10 is a diagram that shows the depth-to-width keyhole aspect ratio. Laser beam 112 is incident on work-side 220 on metal pins 200(1) and 200(2) and travels along work-side 220 as indicated by arrow 1090. Laser beam 112 forms a keyhole 1060 in melt pool 850, with most of the volume of melt pool 850 trailing keyhole 1060. Keyhole 1060 has depth 1062D from the surface of work-side 220 in the negative z-axis direction. The depth-to-width keyhole aspect ratio is depth 1062D divided by width 1062W. While width 1062W may vary along the z-axis, width 1062W generally correlates to the beam size of laser beam 112 as incident on work-side 220. Thus, for most practical purposes, the depth-to-width keyhole aspect ratio is approximately the depth 1062D divided by the diameter of laser beam 112 (e.g., the waist diameter of laser beam 112 when focused on work-side 220).

We have found that spatter and/or void formation tend to occur when the depth-to-width keyhole aspect ratio exceeds 3.0. This finding was based on investigations of several metal pin pairs 200(1,2) made of copper using a combination of real-time imaging of spatter behavior, real-time optical coherence tomography to assess keyhole depth, and post-welding cross sections. Therefore, in one implementation, the threshold value of steps 322 and 332 is 3.0. In another implementation that further reduces the risk of spatter, the threshold value of steps 322 and 332 is less than 3.0. In this implementation, the threshold value may be 2.5, 2.0, or 1.5. Depending on this threshold and a tolerance for spatter, the depth-to-width keyhole aspect ratio is maintained at a value less than 3.0, less than 2.5, less than 2.0 or less than 1.5 throughout method 300.

Steps 322 and 332, although having the same objective, generally are associated with different requirements because the state of the work-side and the melt pool differ between steps 320 and 330. In one implementation, step 322 includes keeping the first delivered rate of energy per unit length at or below a first maximum value, and step 332 includes keeping the second delivered rate of energy per unit length at or below a second maximum value that is only a fraction of the first maximum value for the first delivered rate of energy per unit length in step 322. We have found that, at least under certain circumstances in embodiments of method 300 including steps 322 and 332 and applied to a pair of metal pins made of copper, the second maximum value in step 332 is approximately ⅔ of the first maximum value in step 322. In a corresponding embodiment, the second delivered rate of energy per unit length in step 330 is at most ⅔ of the first delivered rate of energy per unit length in step 320. In an example of this embodiment, step 330 implements step 334 but not step 336 to achieve the desired reduction in the delivered rate of energy per unit length, such that the laser beam traces the second path with a speed that is at least 1.5 times the speed used for the first path in step 320.

We have further found that, at least under certain circumstances in embodiments of method 300 including steps 322 and 332 and applied to a pair of metal pins made of copper, it is preferable to set the second delivered rate of energy per unit length in step 330 to at least ⅕ of the first delivered rate of energy per unit length in step 320. Thus, in one embodiment of method 300, the second delivered rate of energy per unit length in step 330 is between ⅕ and ⅔ of the first delivered rate of energy per unit length in step 320. In an example of this embodiment, step 330 implements step 334 but not step 336 to achieve the desired reduction in the delivered rate of energy per unit length. In this example, the laser beam, in step 330, traces the second path with a speed that is between 1.5 and 5 times the speed used for the first path in step 320. The appropriate speed used for the first path in step 320 depends on other parameters, in particular the laser beam power. In one example, the speed used for the first path in step 320 is in the range between 100 and 600 millimeters per second, and the laser beam power is between 1 and 10 kilowatts.

Method 300 may utilize one or more criteria for when to switch from step 320 to step 330. In one embodiment, method 300 implements a criterion 390 of switching to step 330 before the depth-to-width keyhole aspect ratio reaches a predefined threshold value. This embodiment of method 300 may include steps 322 and 332, and criterion 390 may be based on the same threshold value as used in steps 322 and 332.

As an alternative to or in conjunction with criterion 390, method 300 may implement a criterion 392 of switching from step 320 to step 330 before the keyhole reaches a location on the first path that is already occupied by the melt pool. We have found that, if the keyhole (e.g., keyhole 1060) is allowed to travel on the first path long enough that the melt pool grows to a size that causes the keyhole to catch up with an already existing portion of the melt pool, the keyhole depth essentially instantaneously exceeds the limit at which spatter and/or void formation occur. Therefore, as shown by example in FIG. 8C and indicated by cross 890, criterion 392 imposes switching to step 330 before laser beam 112 reaches a location on path 230 already occupied by a previously formed portion of melt pool 850. In some scenarios, switching from step 320 to step 330 according to criterion 392 also ensures that criterion 390 is met. Although not shown in FIG. 3, method 300 may include a step of imaging the work-side in real time to identify when it is necessary to switch from step 320 to step 330 according to criterion 392. Method 300 may implement both of criteria 390 and 392.

Criteria 390 and 392 both impose an upper limit on the duration of step 320. Method 300 may further implement a criterion 394 that imposes a lower limit on the duration of step 320 by switching to step 330 only after the melt pool has grown to occupy a threshold fraction of the area within and defined by the first path. In one example, the threshold fraction is 50%. In another example, the threshold fraction is greater than 50%, such as in the range between 60% and 80%. Although not shown in FIG. 3, method 300 may include a step of imaging the work-side in real time to identify when it is acceptable to switch from step 320 to step 330 according to criterion 394.

In the absence of real-time imaging capability to assess when to switch from step 320 to step 330 according to one or more of criteria 390, 392, and 394, such studies may be performed for one or more samples to determine machine parameters that ensure switching according to one or more of criteria 390, 392, and 394. For example, such studies may determine appropriate values of one or both of (i) the duration on the first path, and (ii) the delivered rate of energy per unit length along the first path. These studies may also determine appropriate values of machine parameters additionally required for step 322, for example (i) the size of the first path, (ii) the delivered rate of energy per unit length along the second path, and (iii) the size of the second path. Thus, method 300 may implement pre-defined machine parameters to perform steps 320 and 330, and switch therebetween, according to one or more of criteria 390, 392, and 394.

In certain embodiments, the duration of step 330 exceeds the duration of step 320, in order to prevent spatter in step 320 while allowing substantial growth of the melt pool in step 330. The total welding time, including steps 320 and 330, may be less than 200 milliseconds, or less than 100 milliseconds.

Method 300 is not limited to the metal pin pairs having the same geometry as metal pin pair 200(1,2). Rather, method 300 is generally applicable to edge welding of metal parts, and is particularly well suited for welding of rectangular bar wire. The rectangular bar wire pair, or pin pair, may be joined with geometries different from that of metal pin pair 200(1,2), as long as the two respective surfaces of the two metal parts are adjacent to each other to form a work-side for welding.

FIG. 11 illustrates a pair of metal pins 1100(1) and 1100(2) that are joined such that their respective end surfaces 1104(1) and 1104(2) face in opposite directions. Metal pins 1100(1) and 1100(2), as depicted in FIG. 11, may be ends of respective hairpins or I-pins. Metal pin pair 1100 (1,2) represents one example of a pin pair geometry that is different from that of metal pin pair 200(1,2). A work-side 1102, for welding according to method 300, is provided by two adjacent side surfaces 1108(1) and 1108(2) of metal pins 1100(1) and 1100(2), respectively. In an example of method 300, as applied to metal pin pair 1100(1,2), laser beam 112 first traces a larger path 1130 in step 320 and subsequently traces a smaller path 1140 in step 330.

FIG. 12 illustrates, in cross-sectional side view similar to that used in FIG. 2C, one example of a metal pin pair joined with a non-planar work-side for laser welding according to method 300. In this example, two metal pins 1200(1) and 1200(2) terminate in respective ridges 1206(1) and 1206(2), resulting in a V-shaped work-side 1220. The respective portions of work-side 1220 formed by metal pins 1200(1) and 1200(2) still are considered as facing in the same direction in the sense that both portions face generally upward in FIG. 12.

The present invention is described above in terms of a preferred embodiment and other embodiments. The invention is not limited, however, to the embodiments described and depicted herein. Rather, the invention is limited only by the claims appended hereto.

What is claimed is:

1. A method for laser welding a pair of metal pins, comprising steps of:
   delivering a laser beam to a work-side, of the pair of metal pins, formed by a respective pair of exposed surfaces of the metal pins adjacent to each other and facing in the same direction;
   tracing a first path on the work-side with the laser beam at a first delivered rate of energy per unit path length to form a melt pool by keyhole welding, wherein the first path crosses an interface between the metal pins, and the laser beam is incident on (a) the exposed surface of one of the metal pins during one portion of the first path and (b) the exposed surface of the other one of the metal pins during another portion of the first path; and
   before a keyhole, formed by the keyhole welding in the step of tracing the first path, reaches a location on the first path that is occupied by the melt pool, switching from the step of tracing the first path to a step of tracing a second path on the work-side with the laser beam at a second delivered rate of energy per unit path length that is at most ⅔ of the first delivered rate of energy per unit path length, wherein the second path crosses the interface and wherein the entire second path is entirely within the first path, and the laser beam is incident on (a) the exposed surface of one of the metal pins during one portion of the second path and (b) the exposed surface of the other one of the metal pins during another portion of the second path.

2. The method of claim 1, comprising switching from the step of tracing the first path to the step of tracing the second path before a depth-to-width aspect ratio of a keyhole of the keyhole welding reaches a value of three.

3. The method of claim 2, further comprising keeping the depth-to-width aspect ratio at less than three throughout the tracing a first path step and the tracing a second path step.

4. The method of claim 2, further comprising keeping the depth-to-width aspect ratio at less than two throughout the step of tracing the first path and the step of tracing the second path.

5. The method of claim 2, wherein the melt pool spans across the interface before switching from the step of tracing the first path to the step of tracing the second path.

6. The method of claim 1, wherein the step of tracing the second path comprises a step of increasing depth of the melt pool at the interface.

7. The method of claim 1, wherein the pair of metal pins is hairpins or I-pins of a stator.

8. The method of claim 1, wherein the pair of metal pins is made of copper.

9. The method of claim 1, wherein:
   in the step of tracing the first path, the laser beam traces the first path at a first speed and with a first power; and
   in the step of tracing the second path, the laser beam traces the second path at a second speed and with the first power, and the second speed is higher than the first speed.

10. The method of claim 9, wherein the second speed is at least 1.5 times the first speed, and the laser beam has the same power in the step of tracing the first path and the step of tracing the second path.

11. The method of claim 10, wherein the second speed is at most 5 times the first speed.

12. The method of claim 1, wherein:
   in the step of tracing the first path, the laser beam has a first power; and
   in the step of tracing the second path, the laser beam has a second power that is lower than the first power.

13. The method of claim 12, wherein the laser beam traces the first and second paths at the same speed.

14. The method of claim 1, wherein:
   in the step of tracing the first path, the laser beam has a first power and traces the first path at a first speed; and
   in the step of tracing the second path, the laser beam has a second power that is lower than the first power and traces the second path at a second speed that is higher than the first speed.

15. The method of claim 1, wherein transverse dimensions on the work-side of the second path are between 20% and 80% of corresponding transverse dimensions on the work-side of the first path.

16. The method of claim 1, wherein a duration of the step of tracing the second path exceeds a duration of the step of tracing the first path.

17. The method of claim 1, wherein the first path is a closed path.

18. The method of claim 17, comprising performing switching the step of tracing the first path to the step of tracing the second path after that the melt pool has grown to occupy at least half of an area within and defined by the closed path.

19. The method of claim 17, wherein each of the first and second paths is an ellipse.

20. The method of claim 17, wherein the second path is an inward spiral starting from the first path.

21. The method of claim 1, wherein the first path is an open path.

* * * * *